(12) United States Patent
Barnett

(10) Patent No.: US 10,900,887 B2
(45) Date of Patent: Jan. 26, 2021

(54) CORROSION PREVENTION SURVEY SYSTEM AND METHOD OF USE

(71) Applicant: Russell Barnett, Millsap, TX (US)

(72) Inventor: Russell Barnett, Millsap, TX (US)

( * ) Notice: Subject to any disclaimer, the term of this patent is extended or adjusted under 35 U.S.C. 154(b) by 159 days.

(21) Appl. No.: 16/205,954

(22) Filed: Nov. 30, 2018

(65) Prior Publication Data

US 2019/0162649 A1    May 30, 2019

Related U.S. Application Data

(60) Provisional application No. 62/592,654, filed on Nov. 30, 2017.

(51) Int. Cl.
*G01R 27/08* (2006.01)
*G01N 17/02* (2006.01)
*G01N 27/20* (2006.01)

(52) U.S. Cl.
CPC .......... *G01N 17/02* (2013.01); *G01N 27/205* (2013.01)

(58) Field of Classification Search
CPC .... G01N 17/0006; G01N 17/02; G01N 17/04; G01N 17/043; G01N 27/02; G01N 27/20; G01N 27/205; G01N 27/041; G01N 27/24; G01N 27/26
See application file for complete search history.

(56) References Cited

U.S. PATENT DOCUMENTS

| 4,151,458 A * | 4/1979 | Seager | G01N 17/02 324/329 |
| 4,388,594 A * | 6/1983 | Deskins | C23F 13/04 324/348 |
| 8,111,078 B1 * | 2/2012 | Yang | G01N 17/02 324/700 |
| 2010/0039127 A1 * | 2/2010 | Orazem | C23F 13/04 324/718 |
| 2020/0064390 A1 * | 2/2020 | Marsden | G01R 31/083 |

FOREIGN PATENT DOCUMENTS

WO    WO8809498    * 12/1988

* cited by examiner

*Primary Examiner* — Thang X Le
(74) *Attorney, Agent, or Firm* — Richard Eldredge; Eldredge Law Firm

(57) ABSTRACT

A corrosion prevention survey system for determining locations of faults along an underground structure includes a data collector to record location data and voltage data; a voltage reading system to secure to a leg of a user, the voltage reading system having a pole with a spike to be inserted into a ground surface, the spike being able to read a voltage current running through the ground; an attachment device to secure the pole to the leg of a user; and one or more wires to connect the pole to the data collector; the pole is a predetermined length not greater than 2 feet; the voltage data is transmitted from the pole to the data collector; and the location data and voltage data are used in analysis to determine directions of voltage gradients for further determination of location of faults along the underground structure.

10 Claims, 3 Drawing Sheets

CORROSION PREVENTION SURVEY SYSTEM AND METHOD OF USE

BACKGROUND

1. Field of the Invention

The present invention relates generally to corrosion prevention survey systems, and more specifically, to a corrosion prevention survey system for hands-free data collection through the use of one or more survey devices secured to a user's boot or leg.

2. Description of Related Art

Corrosion prevention survey systems are well known in the art and are effective for assessing corrosion on buried steel structures, such as oil and gas pipelines. The principal behind the surveys assumes that a buried pipeline is protected using Impressed Current Cathodic Protection. If there are any defects in the coating, then electrical current flow from surrounding soil into the pipeline is caused. In the event of a defect, electrical currents cause voltage gradients within the soil, which can in turn be measured by a voltmeter. Corrosion prevention surveys are used to identify directions of gradients, which in turn provides data for determining a location of a fault along the pipeline.

Conventional survey techniques involve the use of a data collector or meter in wired communication with one or more survey poles to be inserted at least partially into a ground surface. During use, the data collector is conventionally secured to a user's chest, while the user walks with the one or more poles in their hands, inserting them partially into the ground, wherein a reading is then transferred and collected by the data collector meter. The data is then used to assess defects along the pipeline.

One of the problems commonly associated with conventional corrosion prevention surveys is the required use of the one or more poles. These poles tie up the user's hands and are therefore inconvenient.

Accordingly, although great strides have been made in the area of corrosion prevention survey systems, many shortcomings remain.

DESCRIPTION OF THE DRAWINGS

The novel features believed characteristic of the embodiments of the present application are set forth in the appended claims. However, the embodiments themselves, as well as a preferred mode of use, and further objectives and advantages thereof, will best be understood by reference to the following detailed description when read in conjunction with the accompanying drawings, wherein:

Figure 1:
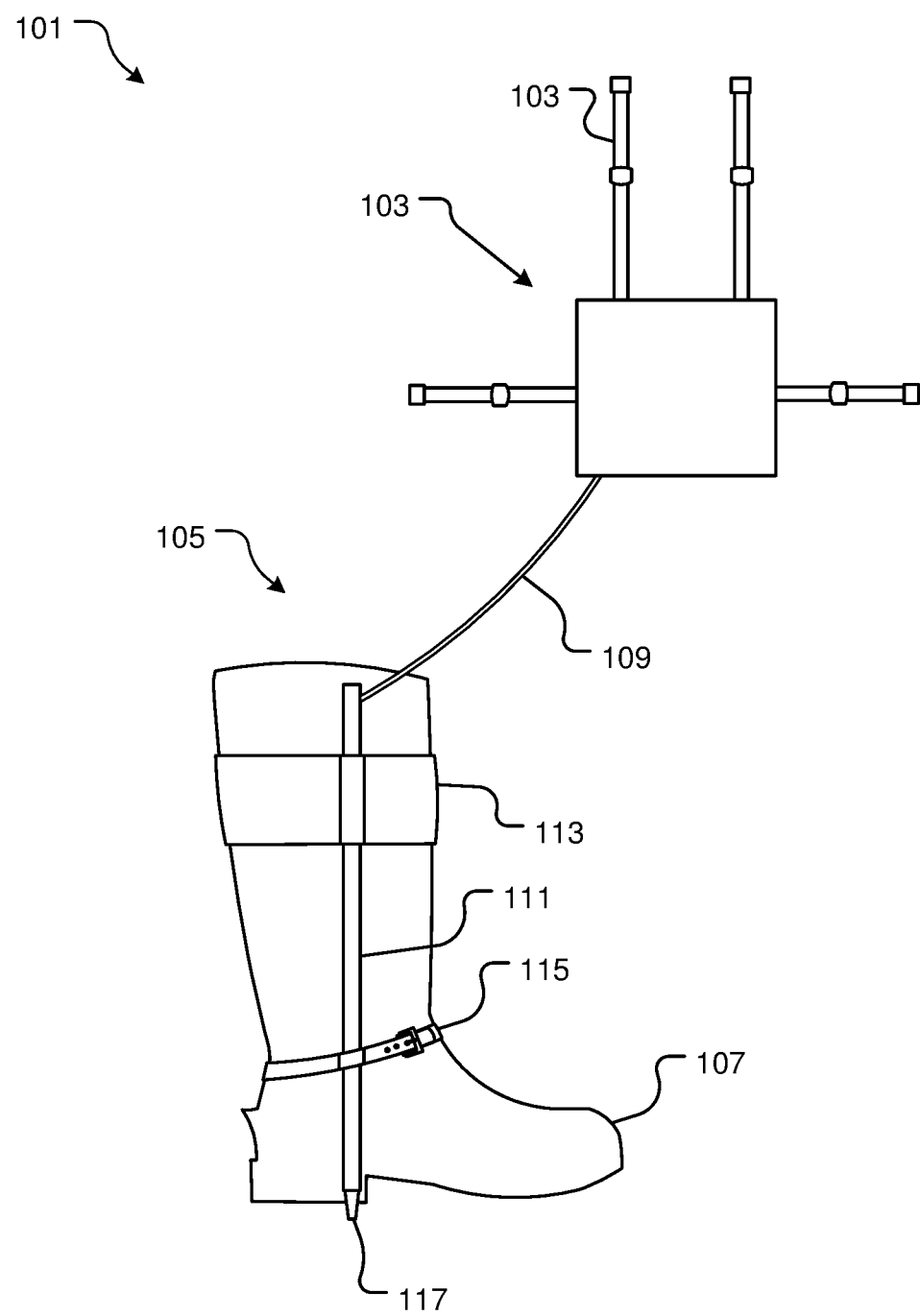
FIG. 1 is a simplified side view of a corrosion prevention survey system in accordance with a preferred embodiment of the present application.

While the system and method of use of the present application is susceptible to various modifications and alternative forms, specific embodiments thereof have been shown by way of example in the drawings and are herein described in detail. It should be understood, however, that the description herein of specific embodiments is not intended to limit the invention to the particular embodiment disclosed, but on the contrary, the intention is to cover all modifications, equivalents, and alternatives falling within the spirit and scope of the present application as defined by the appended claims.

DETAILED DESCRIPTION OF THE PREFERRED EMBODIMENT

Illustrative embodiments of the system and method of use of the present application are provided below. It will of course be appreciated that in the development of any actual embodiment, numerous implementation-specific decisions will be made to achieve the developer's specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The system and method of use in accordance with the present application overcomes one or more of the above-discussed problems commonly associated with conventional corrosion survey systems. Specifically, the present invention provides a means to conduct hands-free corrosion prevention surveys. These and other unique features of the system and method of use are discussed below and illustrated in the accompanying drawings.

The system and method of use will be understood, both as to its structure and operation, from the accompanying drawings, taken in conjunction with the accompanying description. Several embodiments of the system are presented herein. It should be understood that various components, parts, and features of the different embodiments may be combined together and/or interchanged with one another, all of which are within the scope of the present application, even though not all variations and particular embodiments are shown in the drawings. It should also be understood that the mixing and matching of features, elements, and/or functions between various embodiments is expressly contemplated herein so that one of ordinary skill in the art would appreciate from this disclosure that the features, elements, and/or functions of one embodiment may be incorporated into another embodiment as appropriate, unless described otherwise.

The preferred embodiment herein described is not intended to be exhaustive or to limit the invention to the precise form disclosed. It is chosen and described to explain the principles of the invention and its application and practical use to enable others skilled in the art to follow its teachings.

Figure 2:
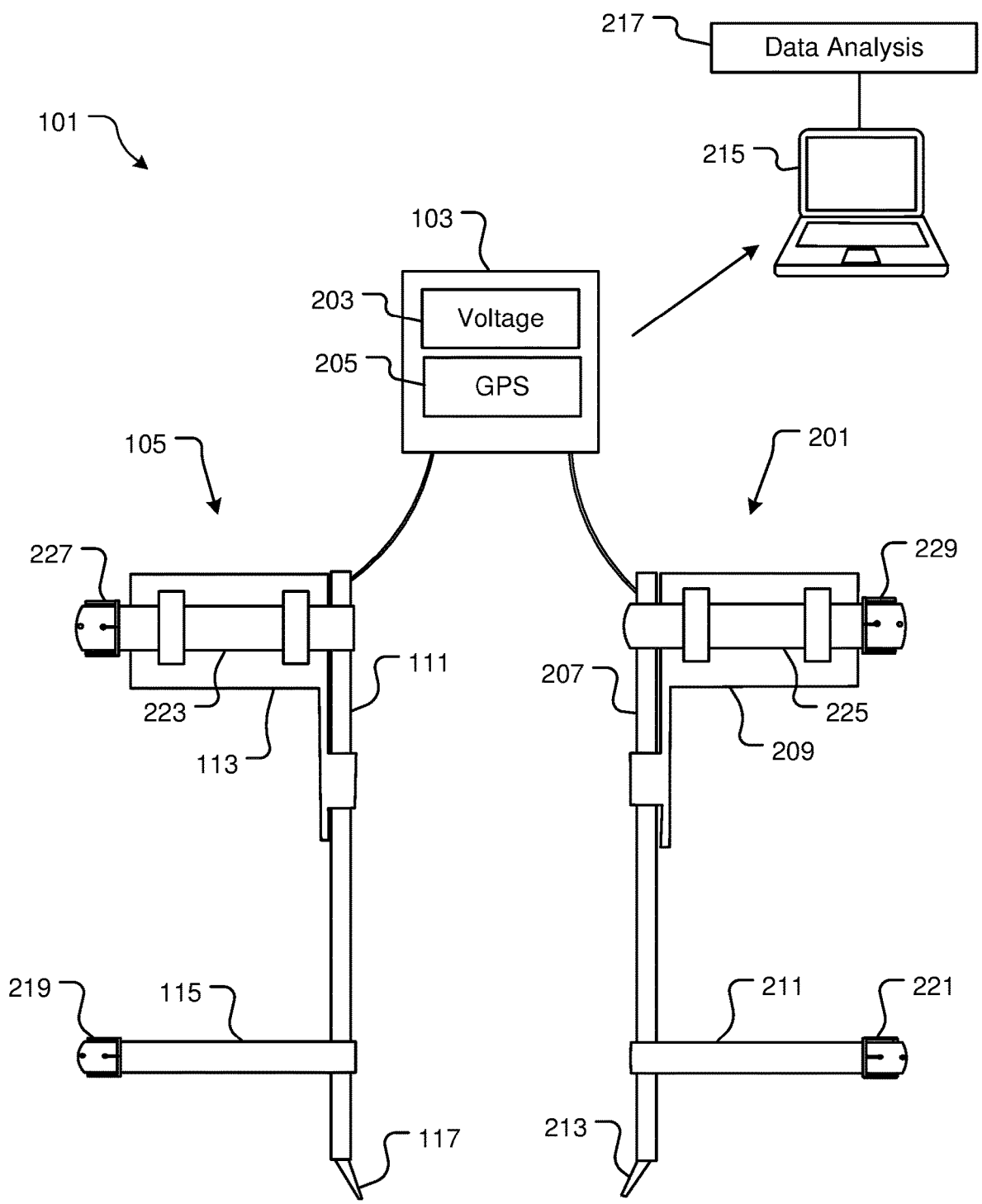
FIG. 2 is a front view of a corrosion prevention survey system in accordance with a preferred embodiment of the present application.

Referring now to the drawings wherein like reference characters identify corresponding or similar elements throughout the several views, FIGS. 1 and 2 depict a front and side views of a corrosion prevention survey system 101 in accordance with a preferred embodiment of the present application. It will be appreciated that system 101 overcomes one or more of the above-listed problems commonly associated with conventional corrosion prevention survey systems.

In FIG. 1, a simplified view shows system 101 with various components removed for clarity. In the contemplated embodiment, system 101 includes data collector 103 in communication with one or more voltage reading systems 105, 201, wherein the voltage reading systems are configured to secure to a boot 107 or legs of the user. In the preferred embodiment, the voltage reading systems are in communication with the data collector 103 via one or more wires 109, however, it is contemplated that wireless versions could be adapted.

It should be appreciated that data collector 103 is a known device in the art configured to read and record voltage data 203 and location data 205. It should be appreciated that the data collector includes necessary components such as a power source, a GPS unit, a processor, a computing chip, a display, and any other component necessary to collect and record data. For example, the data collector 103 could be a standard analogue electronic multimeter or a direct current voltage gradient meter. Data collector 103 can include a plurality of adjustable straps 104 configured to allow for securing the data collector to the user's torso, as is common in the art.

As described herein, voltage reading systems 105, 201 are configured to secure to a user's boot or leg, thereby freeing up the user's hands. Voltage reading systems 105, 201 include poles 111, 207 and one or more attachment devices 113, 115, 209, 211 configured to secure the poles to the boot or leg. At the base of each pole is an extension 117, 213 such as a spike, configured to be inserted into a ground surface with each step of the user. The poles and extensions include the necessary components to read voltage gradients within the soil, the voltage readings to be transferred to the data collector 103. Data collector 103 can be placed in communication with one or more computing devices 215 configured to use the data received, including voltage and location data, to conduct analysis 217 to provide a user with information relating to possible faults along an underground structure, such as a pipeline.

In the preferred embodiment, the poles are less than 2 feet, thereby being conveniently secured to the user's boot or leg, while not preventing movement of the user's legs.

It should be appreciated that one of the unique features believed characteristic of the present application is the voltage reading systems being configured to secure to a user's leg or boot, thereby providing a means to free up the user's hands.

As shown in FIG. 2, attachment devices 115, 211 can be straps with adjustment means 219, 221, the straps being configured to secure around the boot. Attachment devices 113, 209 can be elastic bands to secure around the leg of the user, or alternatively, can be fabric bodies, such as leather, to secure partially around the leg or boot and be held in place via straps 223, 225, with adjustment means 227, 229. It should be appreciated that alternative embodiments could include additional straps, buckles, ties, snaps, hook and loop fasteners, or the like.

Figure 3:
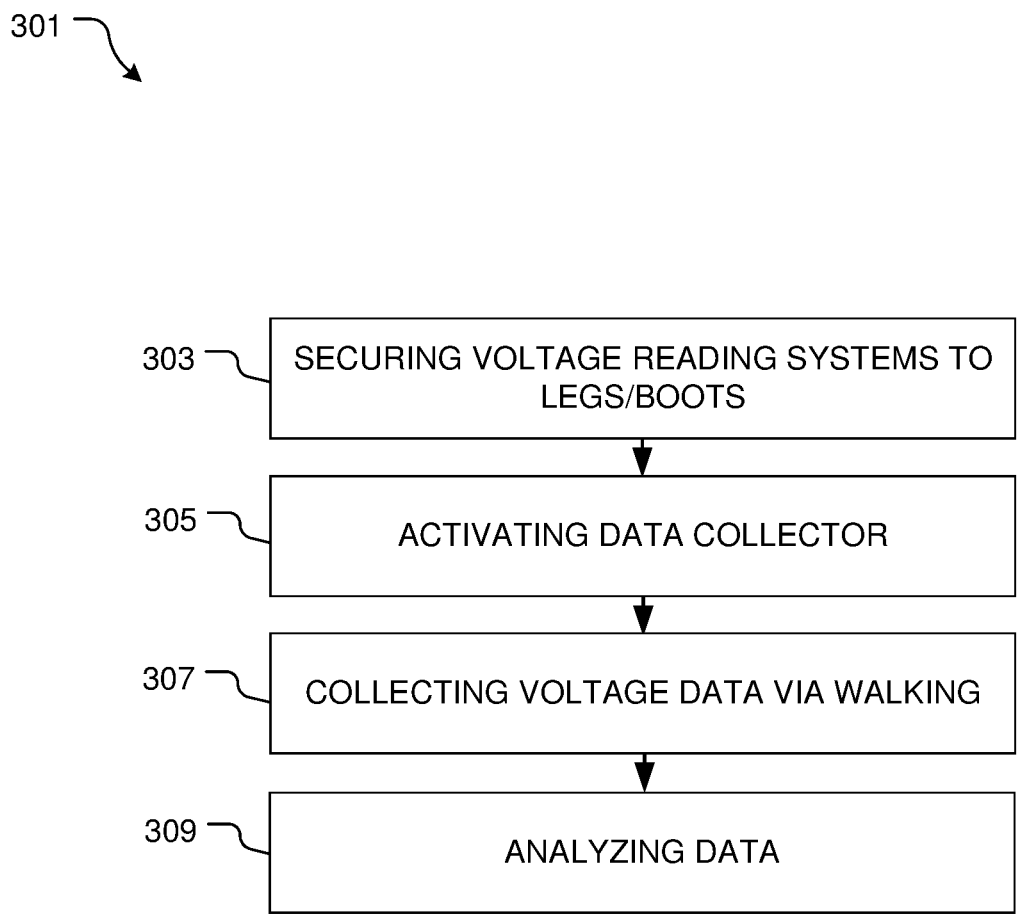
FIG. 3 is a flowchart of the method of use of the systems of FIGS. 1 and 2.

In FIG. 3, a flowchart 301 depicts the method of use of system 101. During use, the voltage reading systems are secured to the user's legs or boots, as shown with box 303. The data collector is activated to collect voltage and location data associated with the poles of the voltage reading systems, as shown with box 305. As the user walks, the extensions of the poles are inserted into the ground surface at various locations, wherein data is collected, as shown with box 307. The user can then analyze the data through use of one or more computing devices, as shown with box 309.

The particular embodiments disclosed above are illustrative only, as the embodiments may be modified and practiced in different but equivalent manners apparent to those skilled in the art having the benefit of the teachings herein. It is therefore evident that the particular embodiments disclosed above may be altered or modified, and all such variations are considered within the scope and spirit of the application. Accordingly, the protection sought herein is as set forth in the description. Although the present embodiments are shown above, they are not limited to just these embodiments, but are amenable to various changes and modifications without departing from the spirit thereof.

What is claimed is:

1. A corrosion prevention survey system for determining locations of faults along an underground structure, the corrosion prevention survey system comprising:
   a data collector configured to record location data and voltage data;
   a voltage reading system configured to secure to legs of a user, the voltage reading system having:
   a pair of poles, each with a spike to be inserted into a ground surface, the spike being configured to read a voltage current running through the ground;
   an attachment device configured to secure the poles to the legs of the user; and
   wires configured to connect the poles to the data collector;
   wherein the poles are a predetermined length not greater than 2 feet;
   wherein the voltage data is transmitted from the poles to the data collector; and
   wherein the location data and voltage data are used in analysis to determine directions of voltage gradients for further determination of location of faults along the underground structure.

2. The system of claim 1, wherein the attachment device is a strap.

3. The system of claim 1, wherein the data collector is a standard analogue electronic multimeter.

4. The system of claim 1, wherein the data collector is a direct current voltage gradient meter.

5. The system of claim 1, wherein the pole includes a copper-copper sulfate electrode.

6. The system of claim 1, wherein the spike includes a metallic probe.

7. A method of surveying for determining locations of faults along a pipeline, the method comprising:
   securing, by an attachment device, a pair of poles of a voltage reading system to legs of a user;
   activating a data collector;
   positioning the poles, each with a spike is inserted into a ground surface with every step of the user;
   measuring, form the poles of the voltage reading system, a voltage of a current running through the ground;
   collecting, by the data collector, voltage data via the voltage reading system; and
   determining the locations of faults along the pipeline based on the voltage data.

8. The method of claim 7, further comprising:
   strapping the data collector to the user's chest.

9. The method of claim 7, further comprising:
   securing a second voltage reading system to the user's other leg.

10. A system for determining locations of faults along an underground structure, the system comprising:
    a data collector configured to record location data and voltage data;
    a voltage reading system configured to secure to legs of a user, the voltage reading system having a pair of poles each with a spike to be inserted into a ground surface, the spike being configured to read a voltage of a current running through the ground; and wire configured to connect the poles to the data collector and to transmit the voltage data from the pole to the data collector.

* * * * *